United States Patent [19]

Egan

[11] 4,249,588
[45] Feb. 10, 1981

[54] PNEUMATIC TIRE

[75] Inventor: William E. Egan, Tallmadge, Ohio

[73] Assignee: The Goodyear Tire & Rubber Company, Akron, Ohio

[21] Appl. No.: 900,458

[22] Filed: Apr. 27, 1978

[51] Int. Cl.³ .............................................. B60C 5/00
[52] U.S. Cl. ............................... 152/357 R; 152/323; 156/128 T
[58] Field of Search ........... 152/354 R, 357 R, 357 A, 152/151, 155, 347, 246, 323; 301/5.3, 5.7, 63 PW, 87.04 A; 156/128 T

[56] References Cited

U.S. PATENT DOCUMENTS

| 3,712,360 | 1/1973 | Torti | 152/357 X |
|---|---|---|---|
| 4,163,467 | 8/1979 | Dobson | 152/347 |

Primary Examiner—Robert B. Reeves
Assistant Examiner—Gene A. Church
Attorney, Agent, or Firm—H. C. Young, Jr.

[57] ABSTRACT

A pneumatic rubber tire having, as its exposed tread, an integral, resilient, covulcanized, closed cell rubber structure.

3 Claims, 2 Drawing Figures

U.S. Patent      Feb. 10, 1981      4,249,588
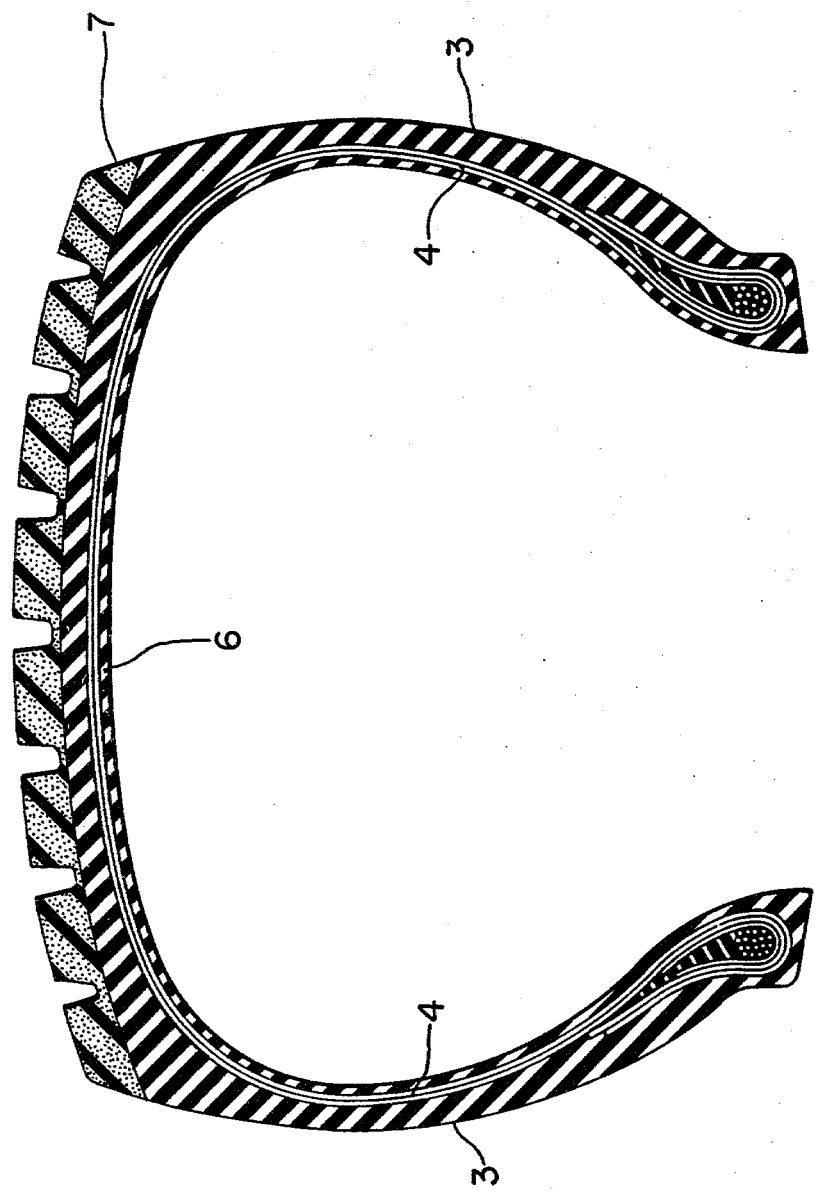
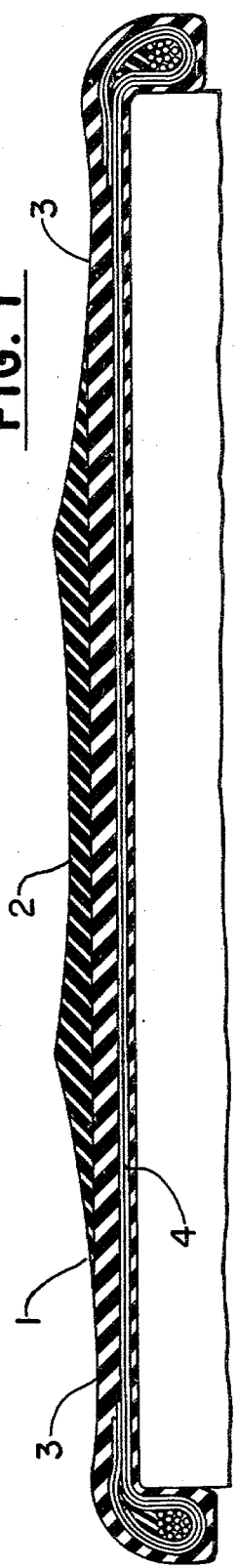

PNEUMATIC TIRE

This invention relates to a pneumatic tire. The invention more particularly relates to a pneumatic tire having a modified tread.

Treads for pneumatic passenger tires are generally optimized by selection of materials and compounds for various purposes, such as treadwear, durability and reduced rolling resistance. However, it is sometimes desired to enhance other tread properties. For example, it is sometimes desired to enhance properties such as softer ride, better traction, cut growth protection, even sidewall protection, and perhaps a degree of puncture sealing or resistance effect. Such tread properties may be desired, for example, for off-the-road and golf cart vehicle tires.

It is, therefore, an object of this invention to provide a pneumatic tire having a modified tread.

In accordance with this invention, a pneumatic tire is provided having, as its outer ground contacting portion, an integral, resilient, covulcanized, closed cell structure.

In this regard, a conventional pneumatic tire is further provided having, as its basic structure, two spaced, relatively inextensible, beads, a ground contacting tread portion, a pair of individual sidewalls extending radially inward from the axial outer edges of said tread portion to join the respective beads, a supporting carcass structure for the tread portion and sidewalls, usually extending from bead to bead, and an integral, covulcanized, resilient rubber, closed cell structure, disposed outwardly of said tread portion. The said supporting structure is that portion of the tire generally considered the carcass which includes reinforcing plies and normally includes an inner air barrier layer which is typically the innermost part of the tire in contact with, or adjacent to, the air of inflation.

The integral, covulcanized resilient rubber closed cell structure disposed outwardly of said tread, and exposed, can be of various thicknesses ranging from about 0.25 to about one inch, depending somewhat on the tire size and purpose.

Optionally, the cell structure can extend over and include at least a portion of the outer sidewall area of the tire.

The invention relies upon the cooperative combination feature of the critical requirements of the integral, covulcanized, resilient, closed cell structure to enable the outer, exposed, tread and optionally the outer, exposed, sidewall to be more durable or more desirable than a simple foam laminate. In this regard, the resilient, closed cell structure is required to be an integral, dynamic part of the tire itself in the sense of being "covulcanized" therewith.

The cell structure is required to be covulcanized with the tire in order to be integral with the dynamic tire construction. It is built as a solid, unvulcanized layer containing an activatable blowing agent onto the outer portion of the green, unvulcanized tire, generally over a building drum. The constructed tire is then shaped, molded, heated and vulcanized under pressure. The shaping pressure is generally supplied by a shaping bladder positioned within the tire to press and shape it outwardly against the mold. The closed cell structure itself is formed by heat activation of said blowing agent during the vulcanization process to essentially or practically simultaneously expand said adherent, outer solid, compounded layer. Typical vulcanization temperatures range from about 115° C. to about 190° C. Thus, the cell structure forms substantially simultaneously with the covulcanization step to enhance the integral tire feature of construction.

Therefore, the terms "integral" and "covulcanized" have special meaning and, in combination, with each other and activation of the blowing agent, define the cell structure itself as being integral with the outer tire construction, instead of being a simple laminate or retreaded tire.

An additional feature of the preparation of the tire of this invention is in the nature of a substantial departure from typical tire building, shaping and curing methods. Generally, it has heretofore been desired and normally even required, to essentially eliminate air between the tire and the mold in the heating, shaping, molding and vulcanization step. Excessive trapped air between the tire tread portion and the mold surface usually causes the tire to be suitable for scrap. However, in the practice of this invention, the manipulation of the preparation steps require that blowing agent be activated within its compounded, solid rubber outer layer of the tire during its heating, shaping and vulcanization step. The confined cellular structure remains in a compressed state until the vulcanization is essentially complete, following which the mold is open and the tire removed therefrom, resulting in some degree of expansion of the cellular structure.

The cell structure is required to be resilient in order to effectively provide desirable ride qualities for the vehicle that the tire supports.

The resiliency of the cell structure can be characterized by having a compressibility in the range of about 1 to about 800 pounds per square inch (psi) at 50 percent compression at 25° C.

The cell structure typically has a loaded or compounded specific gravity in the range of about 0.5 to about 1.1, preferably about 0.7 to about 0.9, as compared to a comparable loaded, or compounded, solid rubber having a specific gravity in the range of about 1.1 to about 1.2 at about 25° C.

The term specific gravity relates to the rubber being loaded or compounded with pigments and fillers such as carbon black, silica, zinc oxide, various processing oils anti-aging materials, curing and blowing agents.

The vulcanized rubber tire and the covulcanized integral closed cell outer structure can be of various cured or vulcanized rubbers such as natural rubber and synthetic rubber and their mixtures or blends. For example, they can be rubbery butadiene-styrene copolymers, butadiene-acrylonitrile copolymers, cis-1,4-polyisoprene, polybutadiene, isoprene-butadiene copolymers, butyl rubber, halogenated butyl rubber such as chloro or bromo butyl rubber, ethylene-propylene copolymers, ethylene-propylene terpolymers and polyurethane elastomers. Typically the various polymers are cured or vulcanized by normal curing methods and recipes such as with sulfur, or with peroxides in the case of the ethylene-propylene copolymers, or with primary diamines in the case of polyurethane elastomers. The sulfur cured or vulcanized natural rubber and synthetic rubbery polymers are preferred such as butadiene-styrene rubber, cis-1,4-polyisoprene, polybutadiene, butyl rubber, and chlorobutyl rubber and bromobutyl rubber.

The blowing agents used in the practice of this invention for the manufacture of the pneumatic tire are those which liberate gases upon heating and cause the formation of the integral closed cell internal layer. Representative examples of such gases are nitrogen and carbon dioxide. Ammonium bicarbonate and sodium bicarbonate can release carbon dioxide. Usually agents which liberate nitrogen are preferred. Such blowing agents are compounds which give off gases upon being triggered at or near the vulcanization temperatures, representative of which are nitro, sulfonyl and azo compounds such as dinitrosopentamethylene tetramine, N,N'-dimethyl-N,N'-dinitrosophthalamide, azodicarbonamide, N,N'-dinitrosopentamethylene tetramine, sulfonyl hydrazides such as benzenesulfonyl hydrazide, toluenesulfonyl hydrazide and p,p'-oxy-bis-(benzenesulfonyl)-hydrazide and sulfonyl semicarbazides such as p-toluene sulfonyl semicarbazide and p,p'-oxy-bis-(benzenesulfonyl semicarbazide).

The invention will be more readily understood with respect to the accompanying drawings wherein:

FIG. 1 is a cross-sectional view of a cylindrically shaped, green or unvulcanized tire construction containing elements which are to become its tread, sidewall and bead portions, a supporting carcass member for said tread and sidewall; and FIG. 2 is a cross-sectional view of a shaped, molded and cured pneumatic tire having an integral, thin gauge, covulcanized, resilient rubber closed cell structure as its outer tread surface.

More specifically, in the drawings it is shown that a pneumatic rubber tire can be prepared by building an unshaped and unvulcanized basic tire 1 containing what are to become the customary tread portion 2, sidewalls 3 and reinforcing or support carcass member 4, which typically contains fabric reinforced plies to back and reinforce the tread and sidewall portions and an inner air barrier layer. The solid, outer compounded rubber layer 2 which contains a heat activatable blowing agent. The unshaped tire is then placed in a mold where it is shaped, molded and heated under pressure to simultaneously covulcanize the tire and its outer layer 2 and also activate said blowing agent in the outer layer 2 to form a pneumatic tire 6 containing the integral, covulcanized resilient rubber closed cell foam structure 7 as its outer, ground contacting portion.

It should be understood that the pneumatic tire of this invention, although it is depicted in FIG. 2 of the drawings as containing an integral closed cell structure as its outer tread portion, the said cell structure can suitably extend, in the same manner, over at least a part of at least one of its sidewalls, to form its outer, exposed portion, if desired.

The practice of this invention is further illustrated by reference to the following examples which are intended to be representative rather than restrictive of the scope of the invention. Unless otherwise indicated, all parts and percentages are by weight.

EXAMPLE 1

An unshaped, unvulcanized, green rubber tire was built around an 8-inch (20 cm) diameter drum by first building over the drum a lay up of inner air barrier, rubberized fabric plies, sidewall and bead portions as generally shown in FIG. 1 of the drawings. Over the assembled carcass portion was adhered a layer of solid compounded rubber containing a heat activatable blowing agent which is to become its outer, tread portion having a recipe shown in the following Table 1.

TABLE 1

| Compound | Parts |
| --- | --- |
| Butadiene/styrene rubber | 90 |
| Polybutadiene rubber | 10 |
| Process Oil | 49 |
| Wax | 3.80 |
| Carbon Black | 90 |
| Stearic Acid | 2 |
| Antioxidant/Antiozonant | 2.75 |
| Zinc oxide | 3 |
| Curatives | 1.30 |
| Blowing Agent | 5.00 |

The fabricated, unvulcanized green tire was removed from the building form and placed in a tire curing press, or mold. The tire was shaped, molded and vulcanized at a temperature of about 177° C. to form a 16×16.50×8 tire. The tire size identification indicates that it had an inside diameter of 16 inches, or 41 centimeters (cm). During the curing step, the outer layer of the specially compounded rubber formed a cellular structure as its blowing agent was heat activated curing the vulcanization process. Upon removal from the tire press, the outer layer expanded somewhat as an integral, covulcanized, resilient, closed cell structure having a specific gravity of about 0.9 and a thickness of about 0.35 inch.

The tire was then mounted on a rim, inflated to about 12 psig, and various contours and measurements were taken over a period of time.

What is claimed is:

1. A pneumatic rubber tire having, as its outer ground contacting portion and at least a part of its outer sidewall portion, an integral, resilient, covulcanized, closed cell rubber structure, said closed cell structure having a thickness in the range of about 0.25 to about one inch and characterized by having a compressability in the range of about 1 to about 800 psi at 25° C.

2. The pneumatic rubber tire of claim 1 having, as its basic structure, two spaced, relatively inextensible beads, an outer ground contacting tread portion, a pair of individual, outer sidewalls extending radially inward from the axial outer edges of said tread portion to join the respective beads, a supporting carcass structure for said tread and sidewall portions, where said tread and, optionally, sidewall portions are a covulcanized resilient rubber, closed cell structure integral with said carcass.

3. The pneumatic rubber tire of claim 1 where the said integral, covulcanized, resilient rubber, closed cell structure is its outer, ground-contacting tread portion.

* * * * *